(12) United States Patent
Ishii et al.

(10) Patent No.: US 8,283,908 B2
(45) Date of Patent: Oct. 9, 2012

(54) ON-OFF TIMER CIRCUIT FOR USE IN DC-DC CONVERTER

(75) Inventors: Takuya Ishii, Osaka (JP); Chun Kiong Leslie Khoo, Singapore (SG); Ulysses Ramos Lopez, Singapore (SG); Gin Kooi Lim, Singapore (SG); Khairullah Bin Zayadi, Singapore (SG)

(73) Assignees: Panasonic Corporation, Osaka (JP); Panasonic Semiconductor Asia Pte. Ltd., Singapore (SG)

( * ) Notice: Subject to any disclaimer, the term of this patent is extended or adjusted under 35 U.S.C. 154(b) by 330 days.

(21) Appl. No.: 12/718,203

(22) Filed: Mar. 5, 2010

(65) Prior Publication Data

US 2011/0215786 A1 Sep. 8, 2011

(51) Int. Cl.
*G05F 1/00* (2006.01)
(52) U.S. Cl. ......................................... 323/283; 323/285
(58) Field of Classification Search .................. 323/285, 323/283, 284
See application file for complete search history.

(56) References Cited

U.S. PATENT DOCUMENTS

| 4,837,495 | A | 6/1989 | Zansky |
| 5,444,360 | A * | 8/1995 | Drinkwater .................. 323/265 |
| 6,628,106 | B1 | 9/2003 | Batarseh et al. |
| 7,586,294 | B2 * | 9/2009 | Endo .............................. 323/235 |
| 8,040,121 | B2 * | 10/2011 | Ishida et al. .................. 323/285 |
| 2005/0275392 | A1 | 12/2005 | Wong et al. |
| 2009/0243579 | A1 | 10/2009 | Lim et al. |

OTHER PUBLICATIONS

Christophe Basso, "Ramp Compensation for Current-Mode Converters", Power Electronics Technology, Jul. 2004, pp. 67-68.

* cited by examiner

*Primary Examiner* — Shawn Riley
(74) *Attorney, Agent, or Firm* — Greenblum & Bernstein, P.L.C.

(57) ABSTRACT

An ON-OFF timer circuit for use in a DC-DC converter to minimize or eliminate the risk of developing sub-harmonic oscillations that may cause the dc-dc system to be unstable is presented. The apparatus controls and limits the 'On' time duration and 'Off' time duration within one pulse cycle.

13 Claims, 16 Drawing Sheets

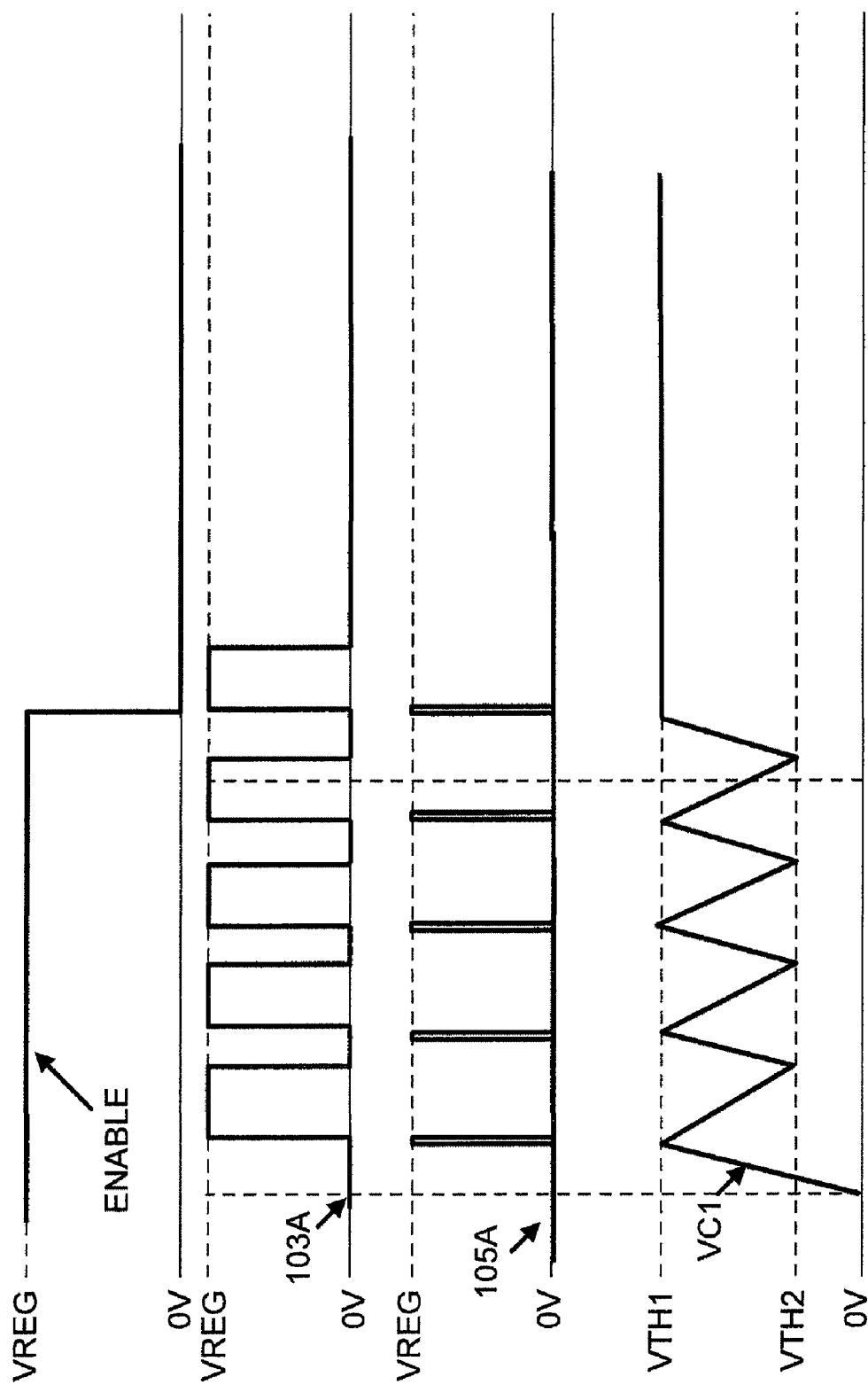

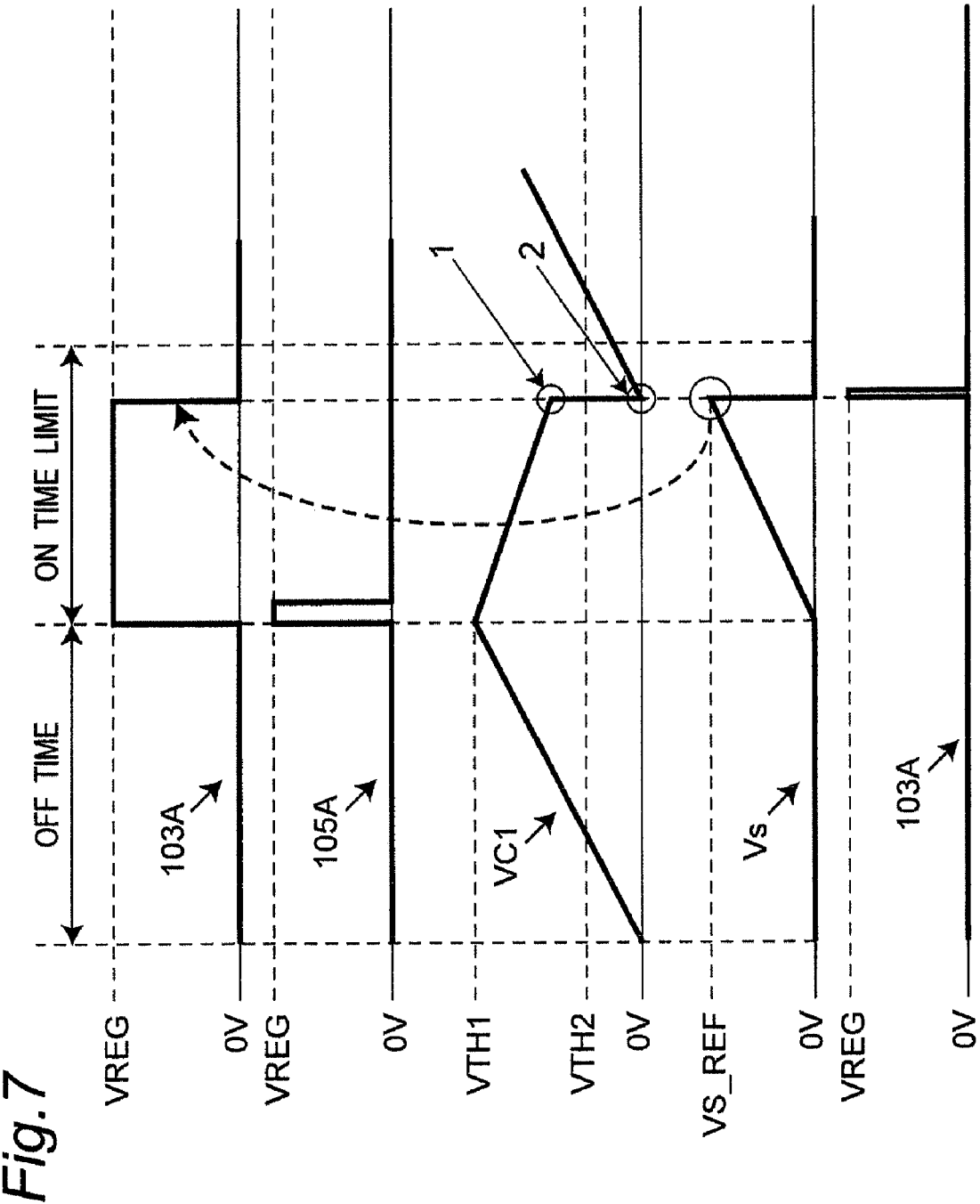

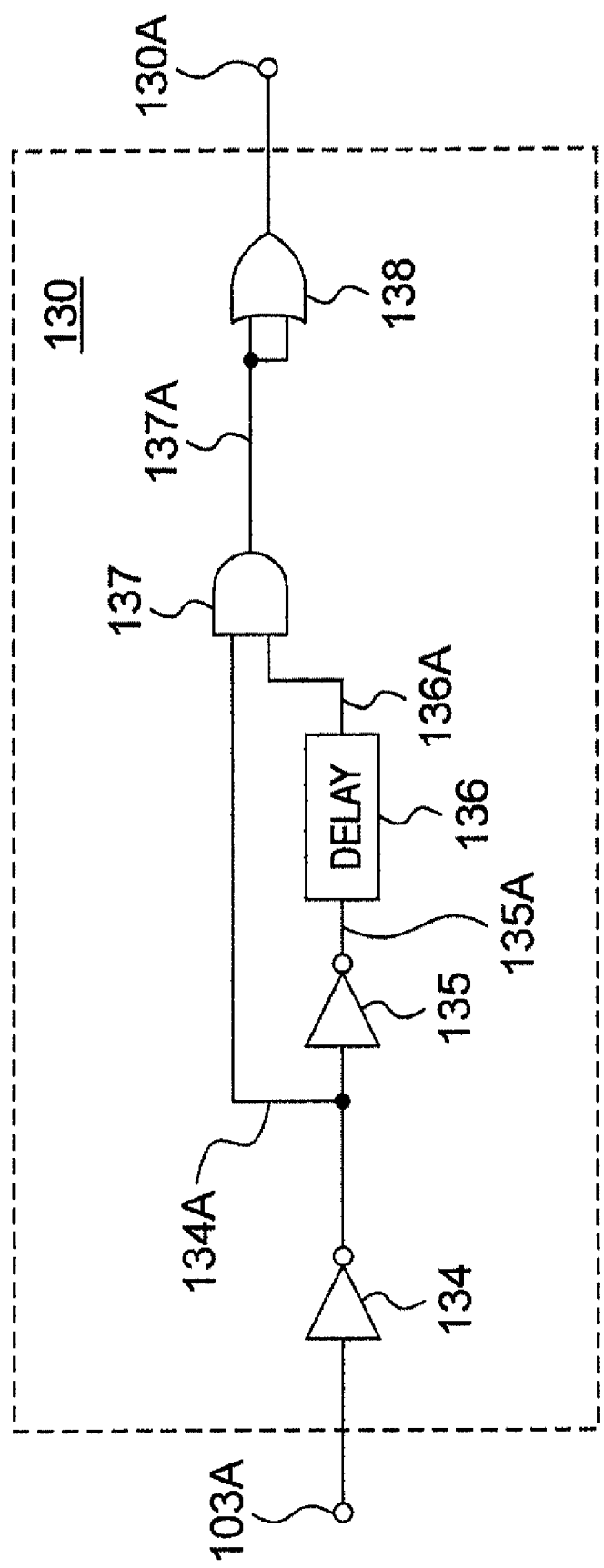

ON-OFF TIMER CIRCUIT FOR USE IN DC-DC CONVERTER

BACKGROUND OF THE INVENTION

The present invention relates to an ON-OFF timer circuit for use in a dc-dc converter. More specifically, the present invention relates to a boost dc-dc converter type for use in driving LEDs.

A conventional boost dc-dc converter is shown in FIG. 1A which is used for driving LEDs, and the signals observed in the boost dc-dc converter are shown in FIGS. 1B and 1C. As shown in FIG. 1B, dc-dc control 2 outputs the switching control signal to a driver circuit 1 before driving the switch 3 for the dc-dc operation. In this mode of operation, there is a possibility of the occurrence of sub-harmonic oscillations, which in turn may cause the dc-dc converter system to become unstable. These sub-harmonic oscillations occur if the following conditions are met:

Operating in continuous conduction mode;
Duty cycle is 50% or higher.

According to a technical report on "Ramp Compensation for Current-Mode Converters" by Christophe Basso of ON Semiconductor, as published in the Power Electronics Technology magazine in July 2004, a resultant perturbation due to the sub-harmonic oscillations may be represented by the formula:

$$\Delta I_L(n) = \Delta I_L(0) \times (D/1-D)^n$$

where D=duty cycle;
n=number of switching cycles;
$I_L$=inductor current;
$\Delta I_L$=inductor current step as a result of the said perturbation.

From the formula, we can see that if the duty cycle D is less than 50%, the perturbation will die out after several cycles. However, for duty cycles more than 50%, the perturbation continues to grow with every cycle. An exemplary waveform showing this phenomenon is as shown in FIG. 1C. In FIG. 1C, a typical inductor current under normal operating condition is given as $I_{L0}$. Upon introduction of the said perturbation ($\Delta I_{L0}$), the resultant oscillating waveform is given by $I_{Lsh}$.

Conventional means to prevent the sub-harmonic oscillations would be to use the Slope Compensation Technique, as described in U.S. Pat. No. 4,837,495 (Current Mode Converter With Controlled Slope Compensation) by Zansky; as well as by using the Hysteretic Control, as described in U.S. Pat. No. 6,628,106 (Control Method and Circuit to Provide Voltage and Current Regulation for Multiphase DC/DC Converters) by Batarseh et al.

These two techniques, however, involve complex systems. The present invention aims to provide a solution to resolve the instability problems described above. Based on the present invention, a technique is introduced for controlling the ON and OFF widths of the output pulse-width modulated waves.

SUMMARY OF THE INVENTION

The purpose of this invention is to provide a technique to minimize or eliminate the risk of developing sub-harmonic oscillations that may cause the dc-dc system to be unstable.

The technique basically comprises controlling the 'On' (pulse duration, τ) and 'Off' (T–τ) durations (Refer to FIG. 1), where T is the period of one pulse cycle.

According to the present invention, an ON-OFF timer circuit for use in a A DC-DC converter comprising: an Off-Timer to keep the Off duration constant; an On-Timer to limit the On duration so as not to exceed a pre-determined time limit; and a flip-flop operable to for generate a first level signal and a second level signal from its output for controlling said Off duration and On duration.

According to the present invention, the Off-Timer comprises: a first current source; a first switch operable to receive said first and second level signals from said flip-flop; a first charging capacitor connected to said first current source through said first switch, said first charging capacitor operable to charge current according to said first current source during when said flip-flop generates said first level signal so as to produce an ascending DC voltage across said first charging capacitor; and a first comparator operable to compare said ascending DC voltage with a predetermined first threshold level, and operable to generate a latch signal when said ascending DC voltage reaches said first threshold level, said latch signal applied to said flip-flop to generate said second level signal.

According to the present invention, the On-Timer comprises: a second current source; a second switch operable to receive said first and second level signals from said flip-flop; a second charging capacitor connected to said second current source through said second switch, said second charging capacitor operable to discharge current according to said second current source during when said flip-flop generates said second level signal so as to produce a descending DC voltage across said second charging capacitor; and a second comparator operable to compare said descending DC voltage with a predetermined second threshold level, and operable to generate a reset signal when said ascending DC voltage drops to said second threshold level, said reset signal applied to said flip-flop to generate said first level signal.

According to the present invention, said first charging capacitor is in common with said second charging capacitor.

BRIEF DESCRIPTION OF THE DRAWINGS

FIG. 5C is a diagram showing a collection of waveforms of selected nodes, illustrating the operation of the second embodiment.

FIG. 7 is a diagram showing waveforms demonstrating the situation when capacitor C1 is not fully discharged when timing duration for On-Timer 102 is ended, and the full discharge by switch 131 prior to start of Off Timer 103.

FIG. 8 is a circuit diagram showing an exemplary implementation of the logic control of the third embodiment of the present invention.

DETAILED DESCRIPTION OF THE PREFERRED EMBODIMENTS

First Embodiment

Figure 2:
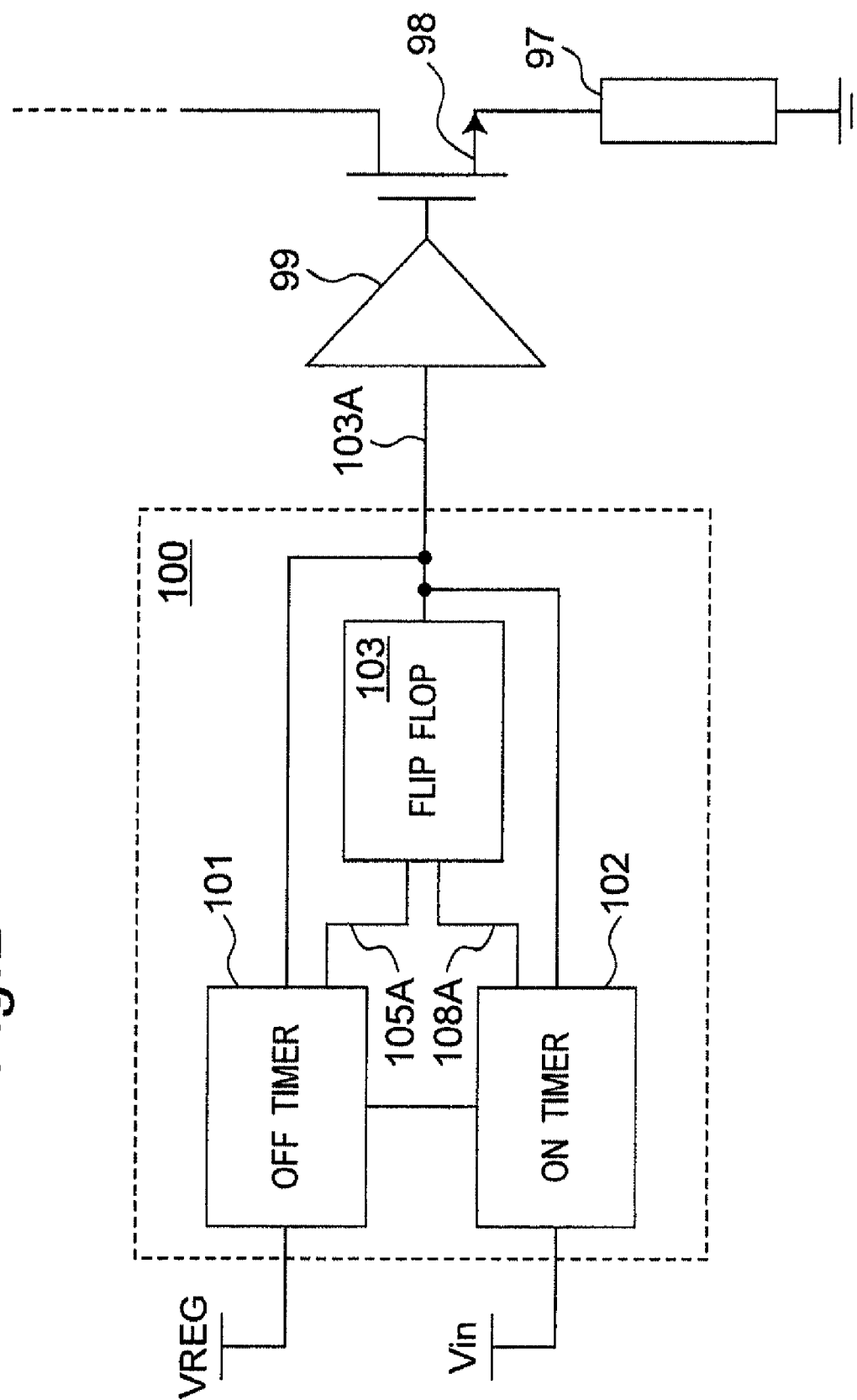
FIG. 2 is a block diagram showing a first embodiment of the present invention.

Referring to FIG. 2, a first embodiment of an On-Off Timer according to the present invention is shown.

Figure 1A:
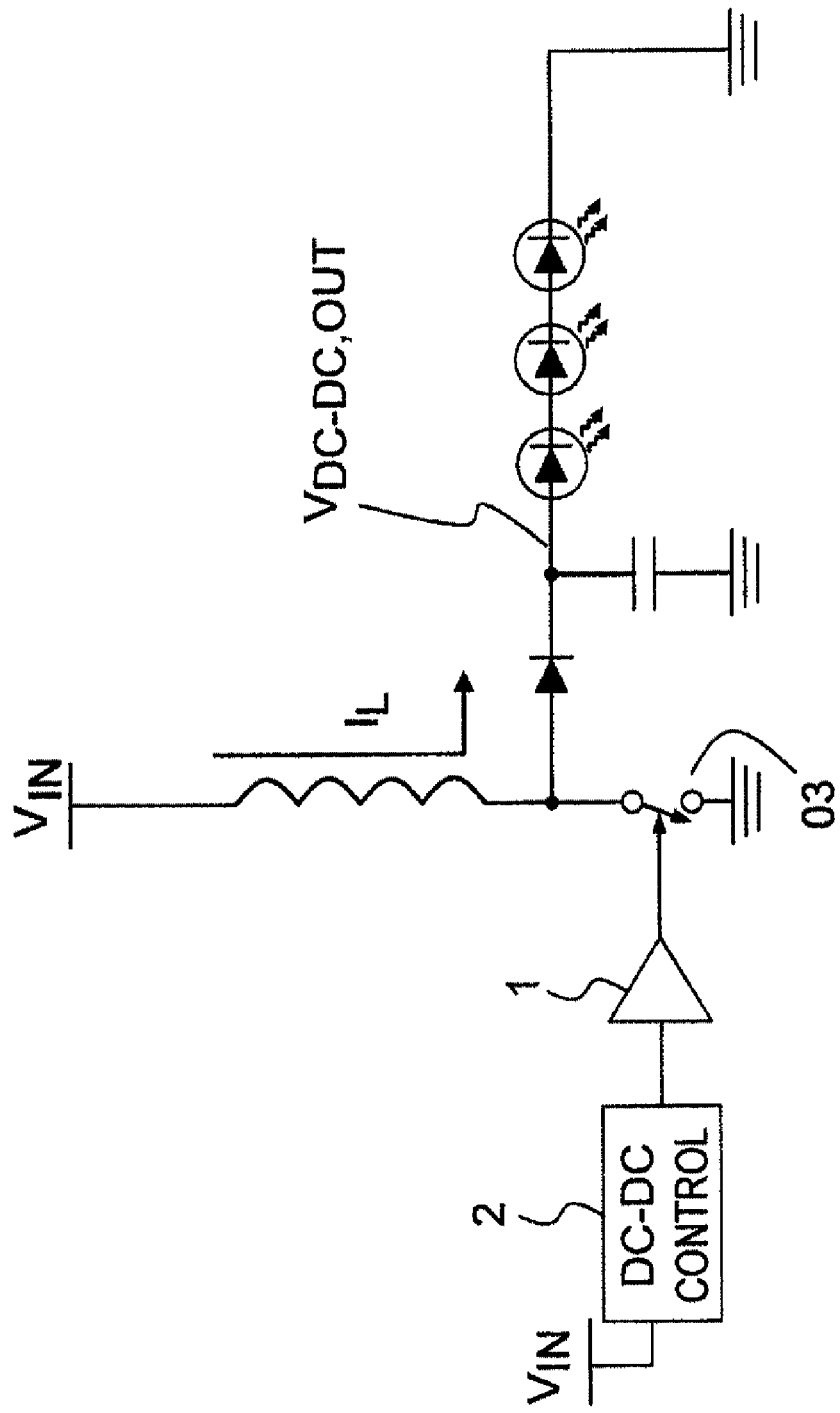
FIG. 1A is a circuit diagram showing a typical set-up for a boost type dc-dc converter according to prior art.

As shown in FIG. 2, the On-Off Timer 100 outputs to a driver block 99, which drives an exemplary output stage comprising an NMOS output power transistor 98 and sense resistor 97 coupled to the emitter terminal of the NMOS output power transistor 98. On-Off Timer 100 may be implemented within the DC-DC control 2 of FIG. 1A.

The On-Off Timer 100 comprises an Off-Timer 101, an On-Timer 102 and a flip-flop 103 which generates a first level signal and a second level signal from its output. The first level signal and the second level signal can be a LOW level signal and a HIGH level signal, or vice versa. As the name suggests, flip-flop 103 may be of any known types of flip-flops, such as the D flip-flop, SR flip-flip or the JK flip-flop. DC voltage levels VREG and Vin are inputted to provide bias voltage and input voltage respectively. VREG is a constant voltage that may be generated from within the IC chip or external source.

The operation of the On-Off Timer 100 is described as follows.

Figure 1B:
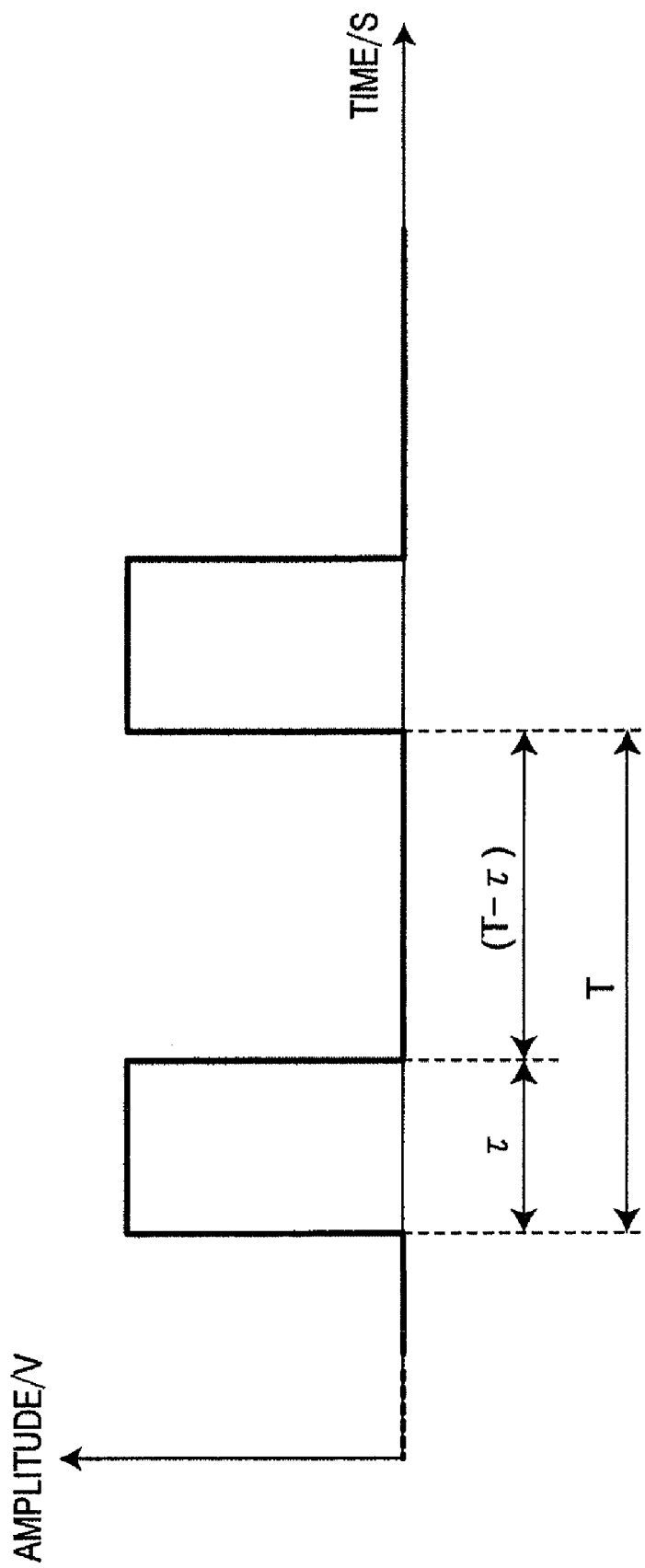
FIG. 1B is a waveform diagram showing a typical rectangular waveform according to prior art.
Figure 1C:
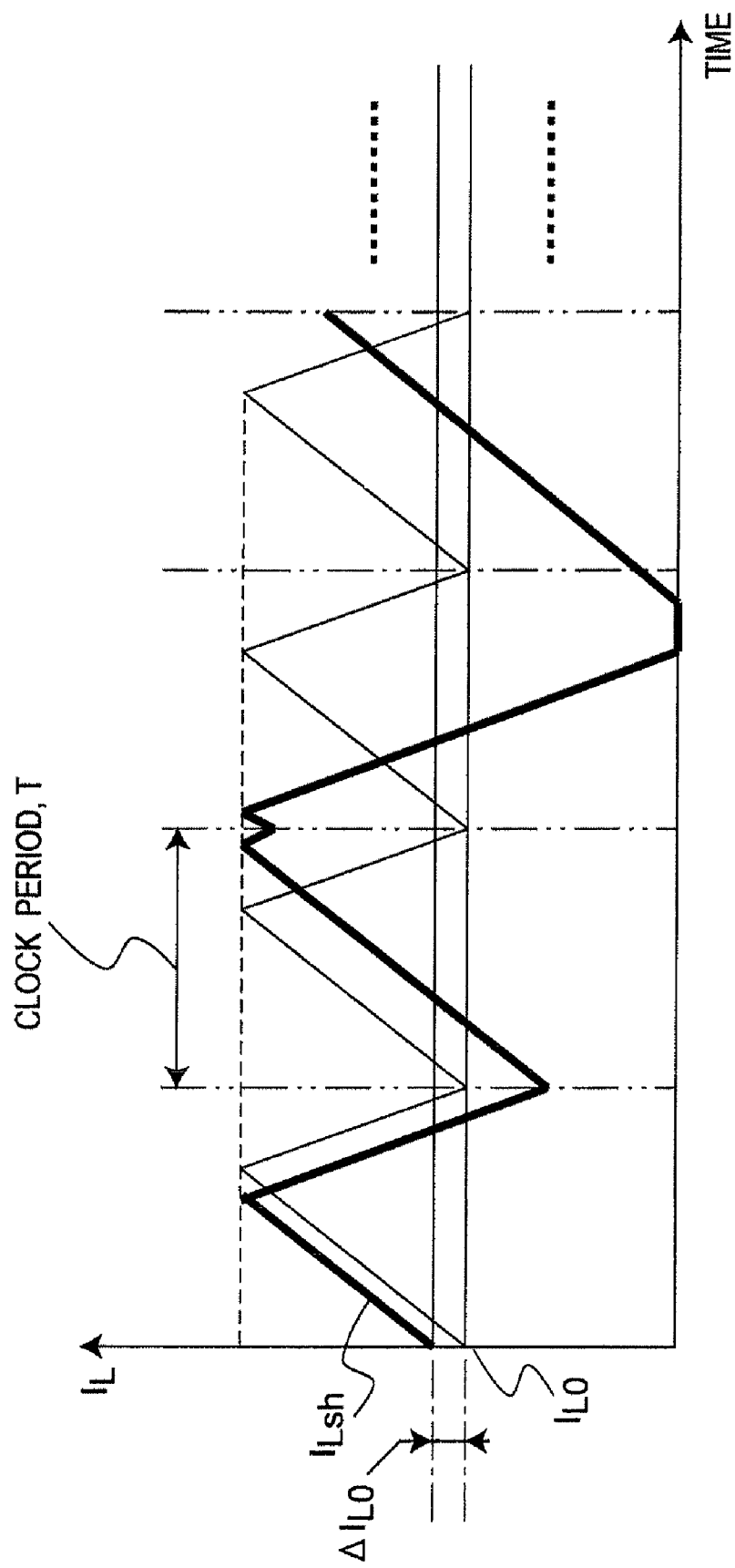
FIG. 1C is an exemplary waveform diagram showing the effect of sub-harmonic oscillation according to prior art.

The Off-Timer 101 serves to keep the 'Off' duration constant, where the 'Off' duration is the duration when the pulse is at a logic LOW level (see FIG. 1B), as shown by (T−τ), where T is the period of one pulse cycle; τ is the 'On' duration, when the pulse is at a logic HIGH level. For this case, we are referring to the pulse output to the driver block 99. Off-Timer 101 communicates with flip-flop 103 via control lines 103A and 105A. It is via these control lines that proper synchronization is accomplished between counting of the 'Off' duration and actual turning on or off of the driver block 99.

The On-Timer 102 is the essential block to prevent instability. On Timer 102 serves to limit the 'On' duration, that is, to not exceed a pre-determined time limit. This way, for cases of abnormality, where 'On' duration persists for a duration exceeding T, On-Timer 102 ensures that 'On' duration goes to logic LOW after the pre-determined time limit.

Figure 3A:
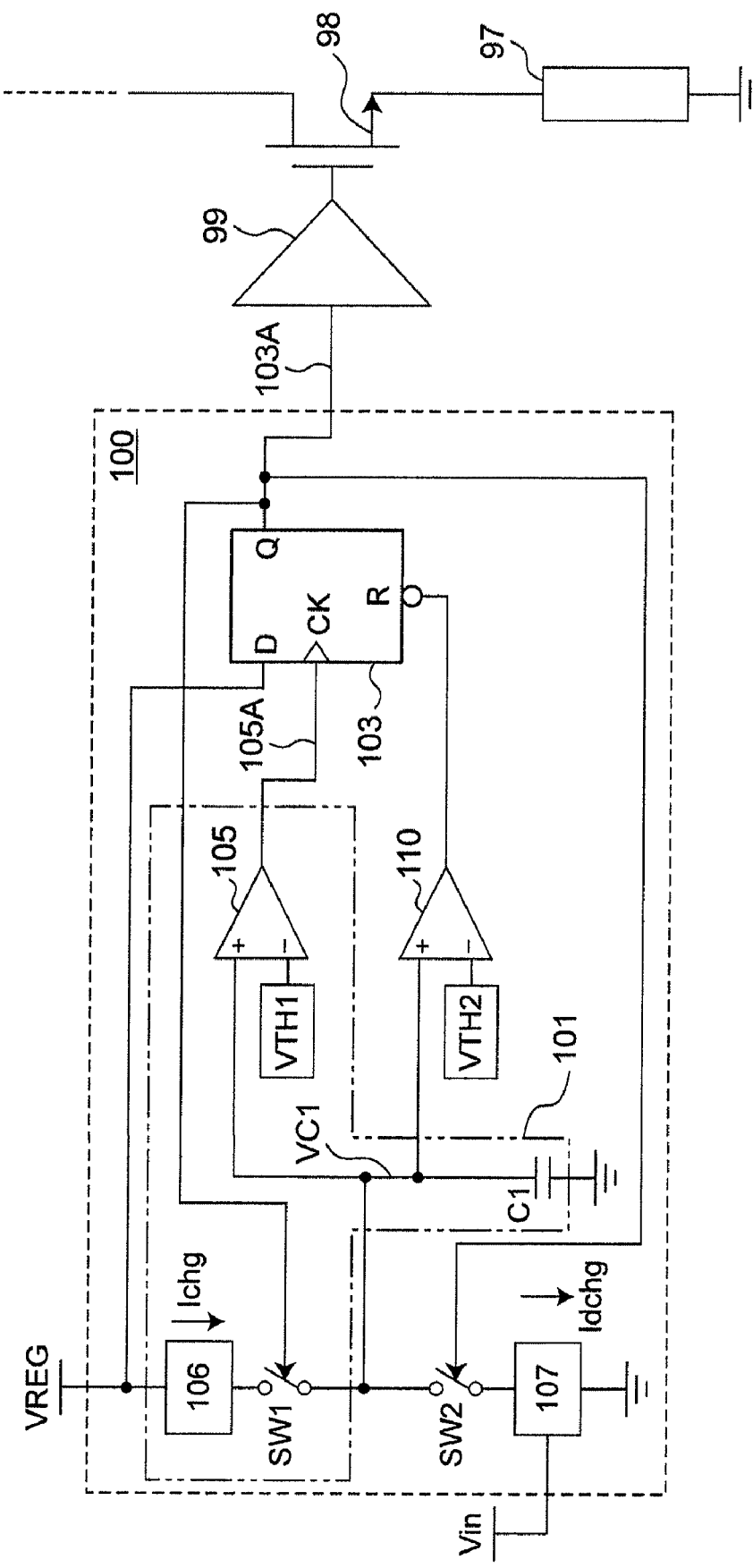
FIG. 3A is a block diagram showing an exemplary implementation of first embodiment of the present invention, highlighting off timer block.

FIG. 3A shows an exemplary implementation of the Off-Timer 101 of the first embodiment of the present invention.

To explain the operation of this exemplary implementation, we shall explain in two parts, namely the Off-Timer 101 and the On-Timer 102. We will explain the Off-Timer 101 first.

As highlighted in FIG. 3A, the Off-Timer 101 comprises a comparator 105, a charging capacitor C1, a switch SW1, a constant current source 106 and a voltage source for producing a reference voltage VTH1.

Switch SW1 may be in the form of any known solid-state switches. For the purpose of explanation, an exemplary PMOS switch is used as switch SW1, as shown in FIG. 3C.

The operation of the Off-Timer 101 is as follows:

The timing duration for the Off-Timer 101 starts when output Q (node 103A) of D flip-flop 103 goes to logic LOW. The timing duration for the Off-Timer 101 is realized by charging up capacitor C1 using constant current Ichg supplied from constant current source 106. Thus, an ascending DC voltage is produced across capacitor C1. The instantaneous voltage across capacitor C1, VC1, is constantly compared with a reference voltage VTH1 using comparator 105. Once VC1 reaches VTH1, this marks the end of the timing duration for the Off-Timer 101. The corresponding waveforms of output Q (node 103A) of D flip-flop 103, output 105A of comparator 105 and instantaneous voltage across capacitor C1, VC1, illustrating the timing duration of the Off-Timer is as shown in FIG. 3E, and denoted by "OFF Time".

From the relationship between the charging current to a capacitor and rate of change of voltage across the capacitor, we have:

$$I = C dV/dT \quad (1)$$

Hence, the timing duration for the Off-Timer 101 may be derived as follows:

$$T_{OFF} = C_{C1} \times VTH1/Ichg \quad (2)$$

(Where $C_{C1}$ = Capacitance of Capacitor C1)

Once the end of the timing duration for the Off-Timer 101 is reached, a logic HIGH pulse signal at 105A will be outputted by comparator 105 to clock input CK of D flip-flop 103. This effectively latches the output Q of the D flip-flop 103 to logic HIGH, as its input D is connected to VREG. Output Q, when logic HIGH, pulls control line 103A to logic HIGH. This in turn causes switch SW1 to be open, thus effectively stopping the charging up of capacitor C1.

Reset pin R of D flip-flop 103 is not used in the Off-Timer 101 operation, but will be used for the On-Timer 102 operation.

Figure 3B:
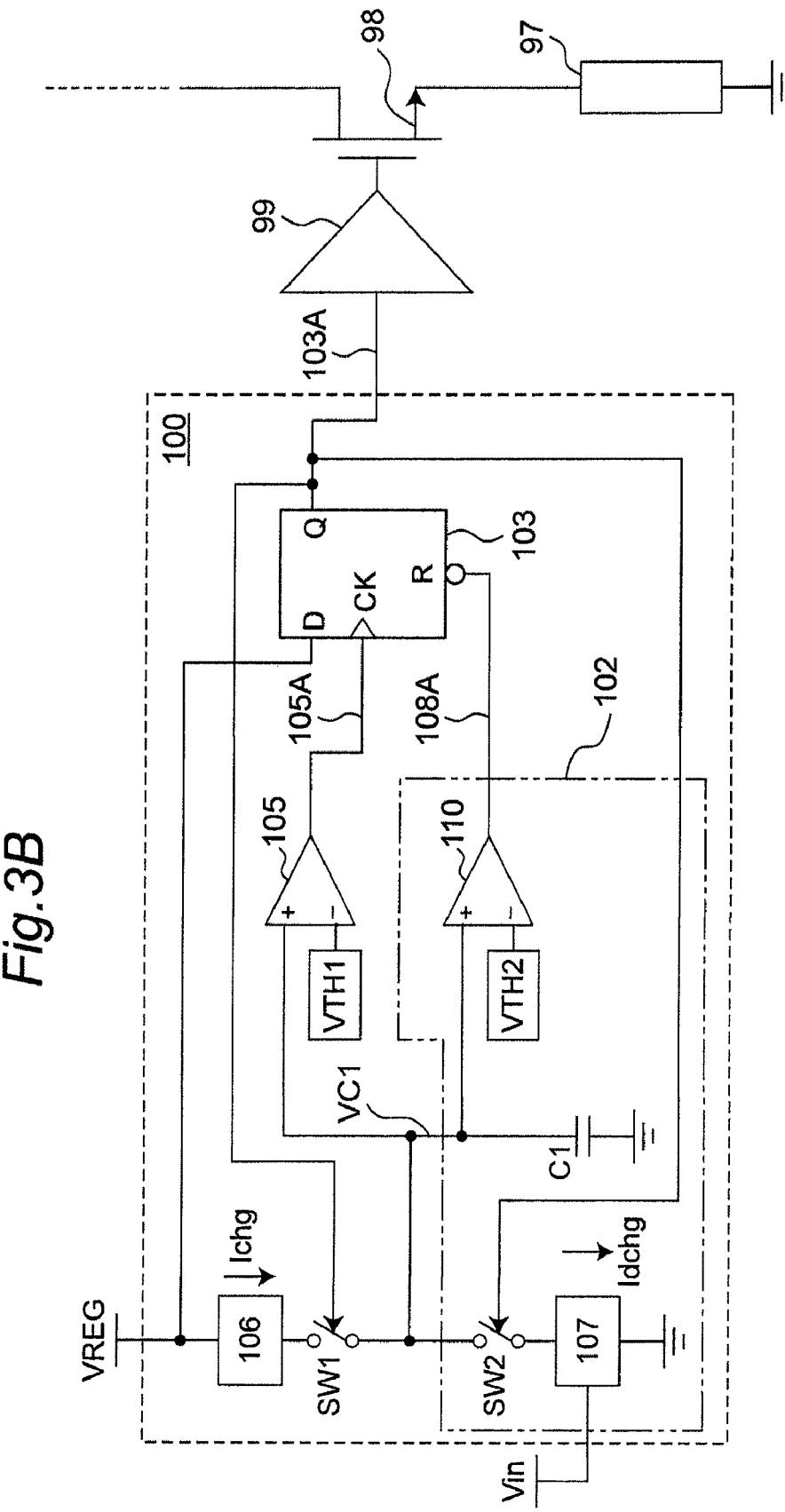
FIG. 3B is a block diagram showing an exemplary implementation of first embodiment of the present invention, highlighting on timer block.
Figure 3C:
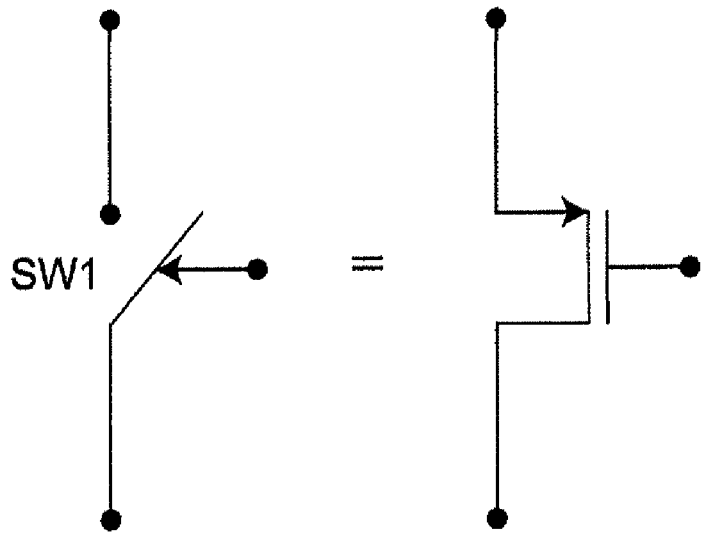
FIG. 3C is a circuit diagram showing a PMOS switch, as exemplarily used for switch SW1.

FIG. 3B shows an exemplary implementation of the On-Timer 102 of the first embodiment of the present invention.

As highlighted in FIG. 3B, the On-Timer 102 comprises a comparator 110, a charging capacitor C1, a switch SW2, a constant current source 107 and a voltage source for produce a reference voltage VTH2. It is noted that the reference voltage VTH1 is greater that the reference voltage VTH2.

Figure 3D:
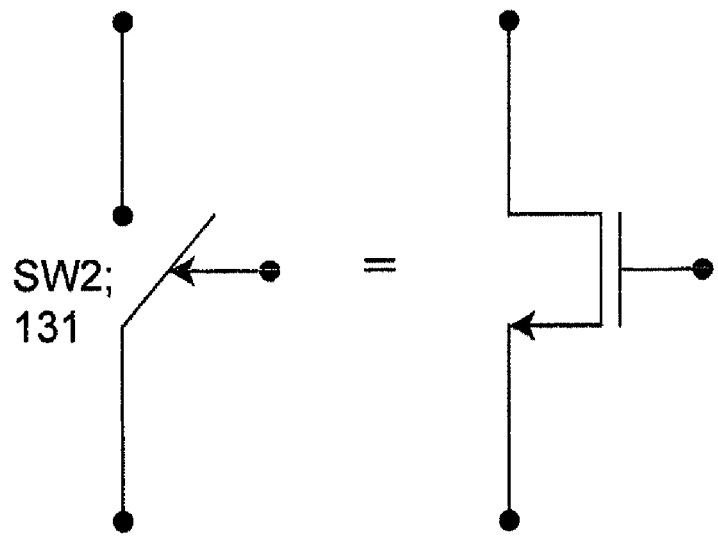
FIG. 3D is a circuit diagram showing an NMOS switch, as exemplarily used for switches SW2 and 131.
Figure 3E:
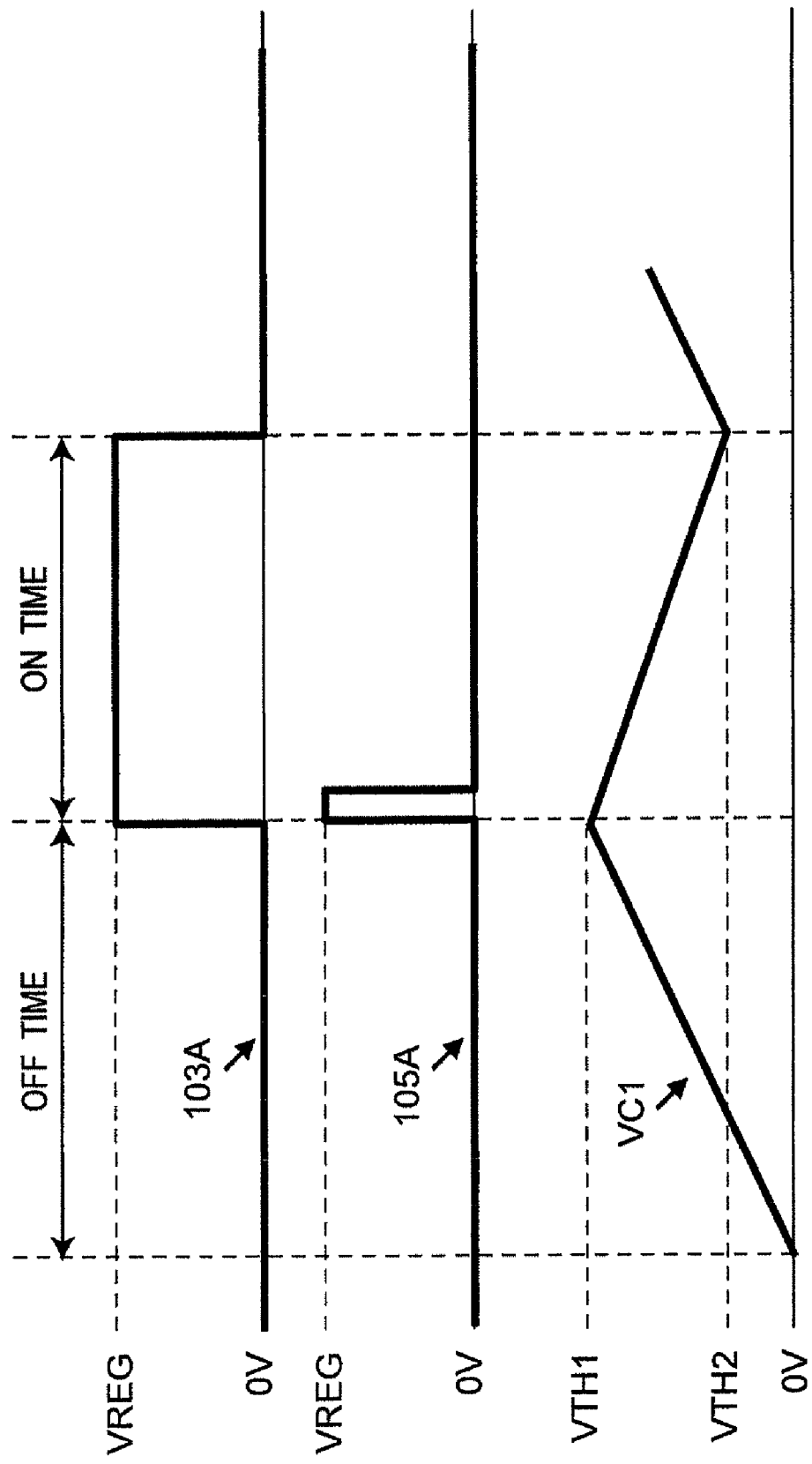
FIG. 3E is a diagram showing a collection of waveforms of selected nodes, illustrating the operation of the first embodiment.

Switch SW2 may be in the form of any known solid-state switches. For the purpose of explanation, an exemplary NMOS switch is used as switch SW2, as shown in FIG. 3D.

The operation of the On-Timer 102 is as follows:

The timing duration for the On-Timer 102 starts when the output Q of D flip-flop 103 goes to logic HIGH. This corresponds to the end of the timing duration for the Off Timer. When node 103A is logic HIGH, this will cause switch SW2 to be closed.

Similar to OFF timer, time limit is set by comparing VC1 to reference voltage VTH2. However this time, capacitor is "discharged" from VTH1 to VTH2 under constant current (Idchg) from current source 107. Thus, a descending DC voltage is produced across capacitor C1. When VC1 has discharged to VTH2, comparator 110 produces a pulse which serves as a reset signal. The reset signal is applied to the reset terminal R of flip-flop 103 so that output Q goes to logic LOW. This means the end of ON time has been reached. From equation (1), ON time $T_{ON}$ can be calculated as follows:

$$T_{ON} = C_{C1} \times (VTH1 - VTH2)/Ichg \quad (3)$$

(Where $C_{C1}$=capacitance of capacitor C1)

Now, the relationship between the timing duration for Off Timer, $T_{OFF}$ and the timing duration for On-Timer 102 $T_{ON}$ is as follows:

$$\text{Duty Cycle}, D=T_{ON}/(T_{ON}+T_{OFF}) \quad (4)$$

Hence, from equation (4), we can see that it is possible to limit the duty cycle D by limiting $T_{ON}$.

The corresponding waveforms of voltage at output Q (node 103A) of D flip-flop 103, output 105A of comparator 105 and instantaneous voltage across capacitor C1, VC1, illustrating the timing duration of the On-Timer is as shown in FIG. 3E, and denoted by "ON Time".

In practical applications, input voltage, Vin, is usually variable, depending on the battery used. It is known that in general, the duty cycle needed to produce a desired output voltage increases as input voltage decreases. This thus implies that to produce the same output voltage, the maximum duty cycle would need to increase as input voltage decreases. Hence, to counteract the effect of variable input voltage, the duty limit of the present invention needs to change with the applied input voltage Vin. An exemplary circuit to implement this counteracting effect is as shown in FIG. 4.

Figure 4:
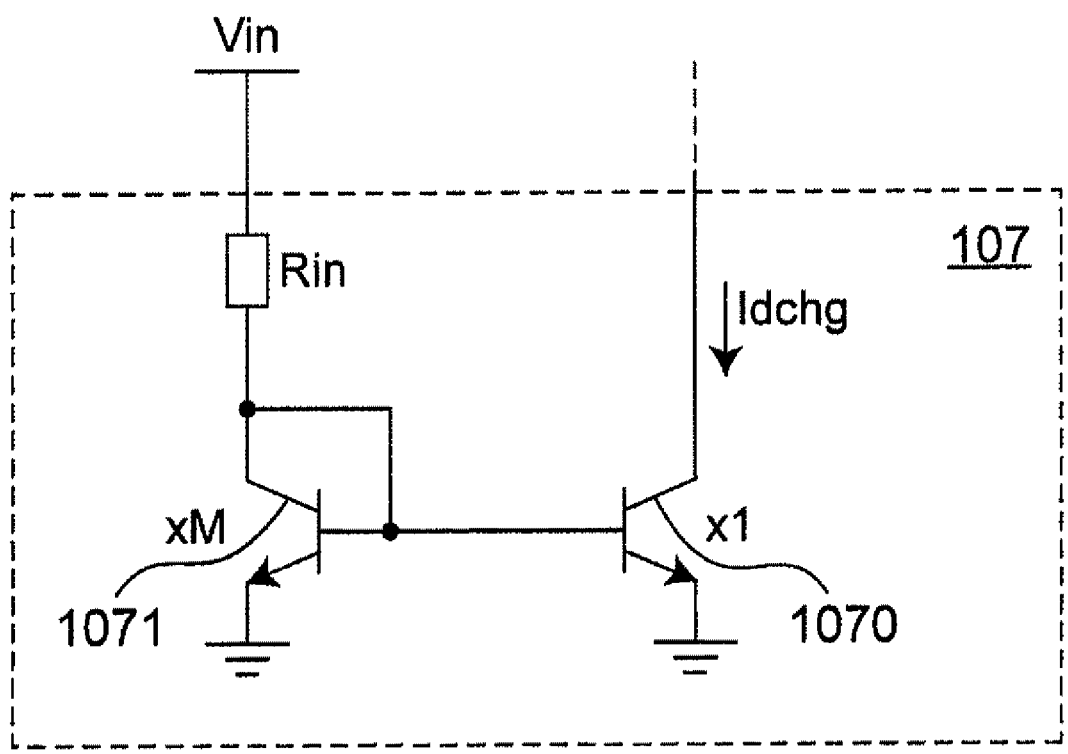
FIG. 4 is a circuit diagram showing an exemplary circuit to counteract effect of variable output voltage.

FIG. 4 is an exemplary circuit to implement constant current source 107 which comprises resistor Rin, NPN transistor 1070 and NPN transistor 1071, whose emitter area is 'M' times the emitter area size of NPN transistor 1070. The value of 'M' is a constant value, determined based on user's preference. Typically, 'M' is designed in a way to optimize both the discharge current and in-chip capacitor value. Using Kirchoff's Voltage Law, we may derive the relationship between Idchg and Vin as follows:

$$Idchg=(Vin-VBE)/(M*RIN) \quad (5)$$

where VBE=base-emitter voltage of NPN transistor 1071.

Second Embodiment

Figure 5A:
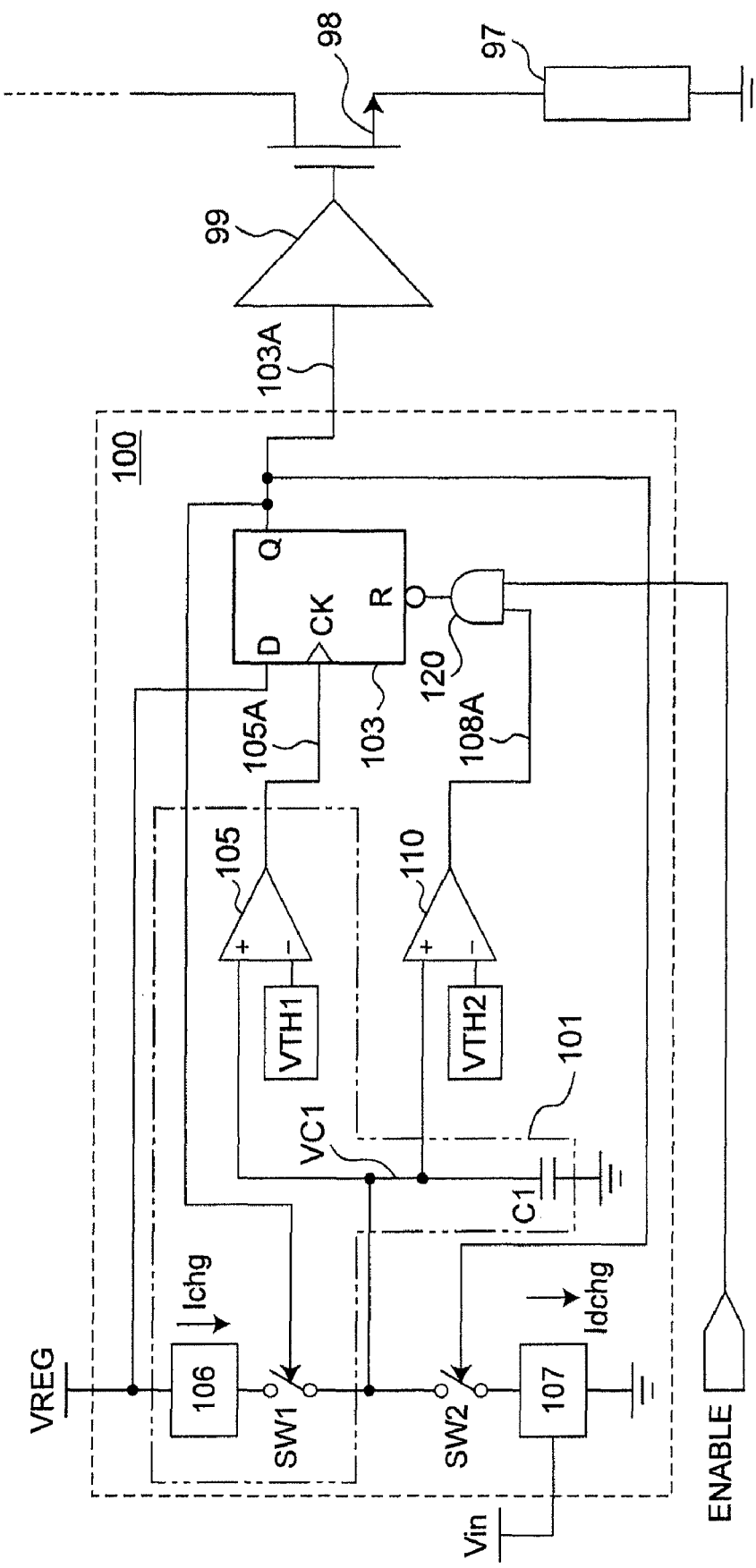
FIG. 5A is a circuit diagram showing an exemplary implementation of the second embodiment of the present invention, with the off-timer highlighted.
Figure 5B:
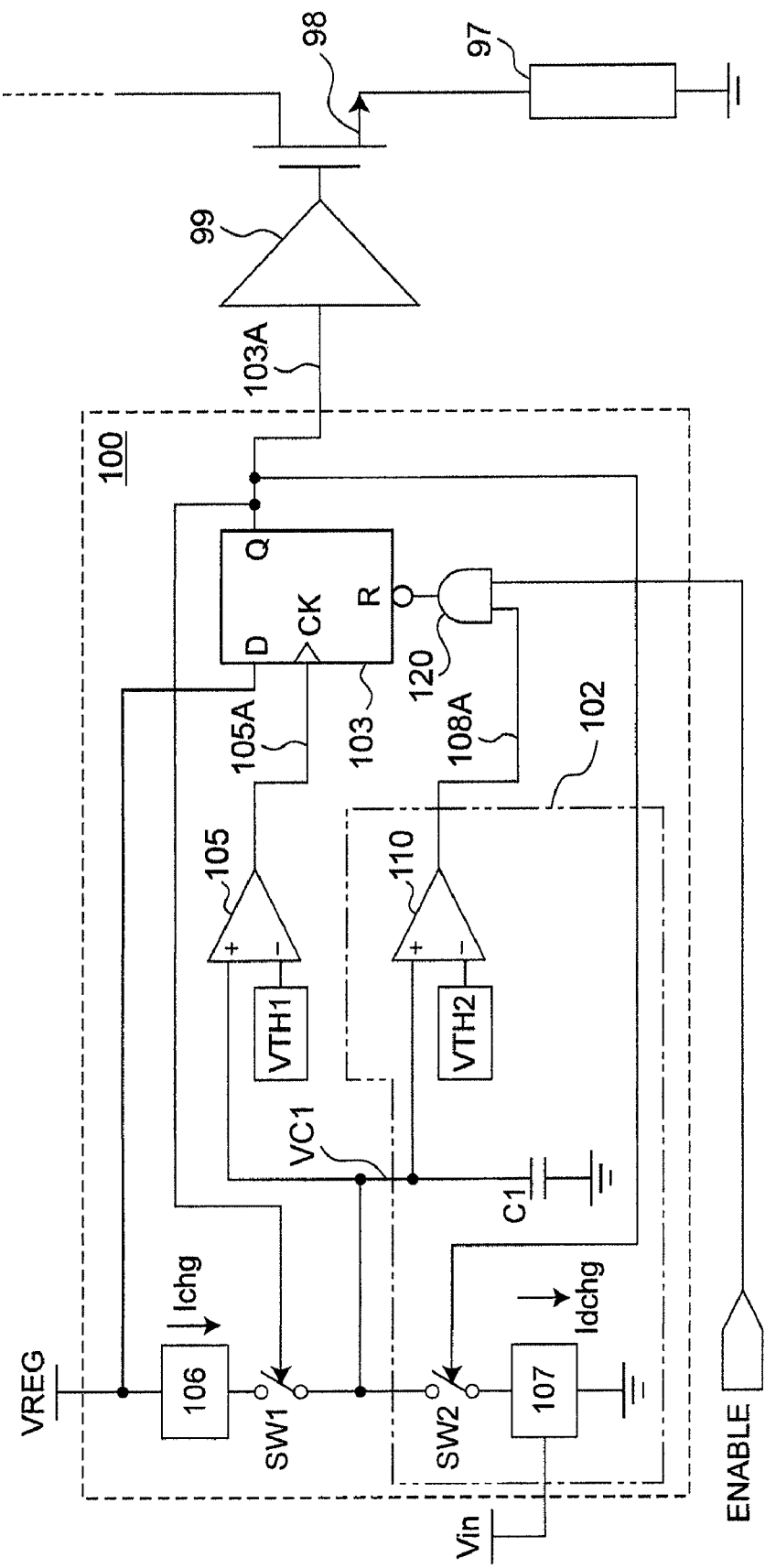
FIG. 5B is an exemplary implementation of the second embodiment of the present invention, with the on-timer highlighted.

Referring to FIG. 5A and FIG. 5B, a second embodiment of an On-Off Timer according to the present invention is shown. The Off-timer and On-timer for the second embodiment are as highlighted in FIG. 5A and FIG. 5B respectively.

Here, it is designed to accept an ENABLE signal, for extra control. The ENABLE signal may be generated from a CPU or initiated by the user. An AND gate 120 is incorporated into the circuit, with its input being the ENABLE signal and the output of comparator 110. With the ENABLE signal, the output Q of D flip-flop 103 can be made low independent of the voltage at VC1.

During initial condition, VC1=0; the ENABLE signal is logic LOW, causing the D flip-flop 103 to reset, that is, output Q goes to logic LOW. This further results in NMOS output power transistor 98 being turned off. When ENABLE signal goes logic HIGH, output Q of D flip-flop 103 remains logic LOW, corresponding to the start of the timing duration of the Off-Timer 101. As described earlier, current source 106 charges up capacitor C1 until VC1 reaches VTH1. When this occurs, output Q of D flip-flop 103 goes logic HIGH, corresponding to the start of the timing duration for On-Timer 102. This will thus cause switch SW1 to be opened and switch SW2 to be closed, thus causing current source 107 to discharge capacitor C1. Once fully discharged, the On-Off cycle continues.

The corresponding waveforms of the ENABLE signal, voltage at output Q (node 103A) of D flip-flop 103, output 105A of comparator 105 and instantaneous voltage across capacitor C1, VC1, illustrating the operation of the second embodiment is as shown in FIG. 5C.

Third Embodiment

Figure 6A:
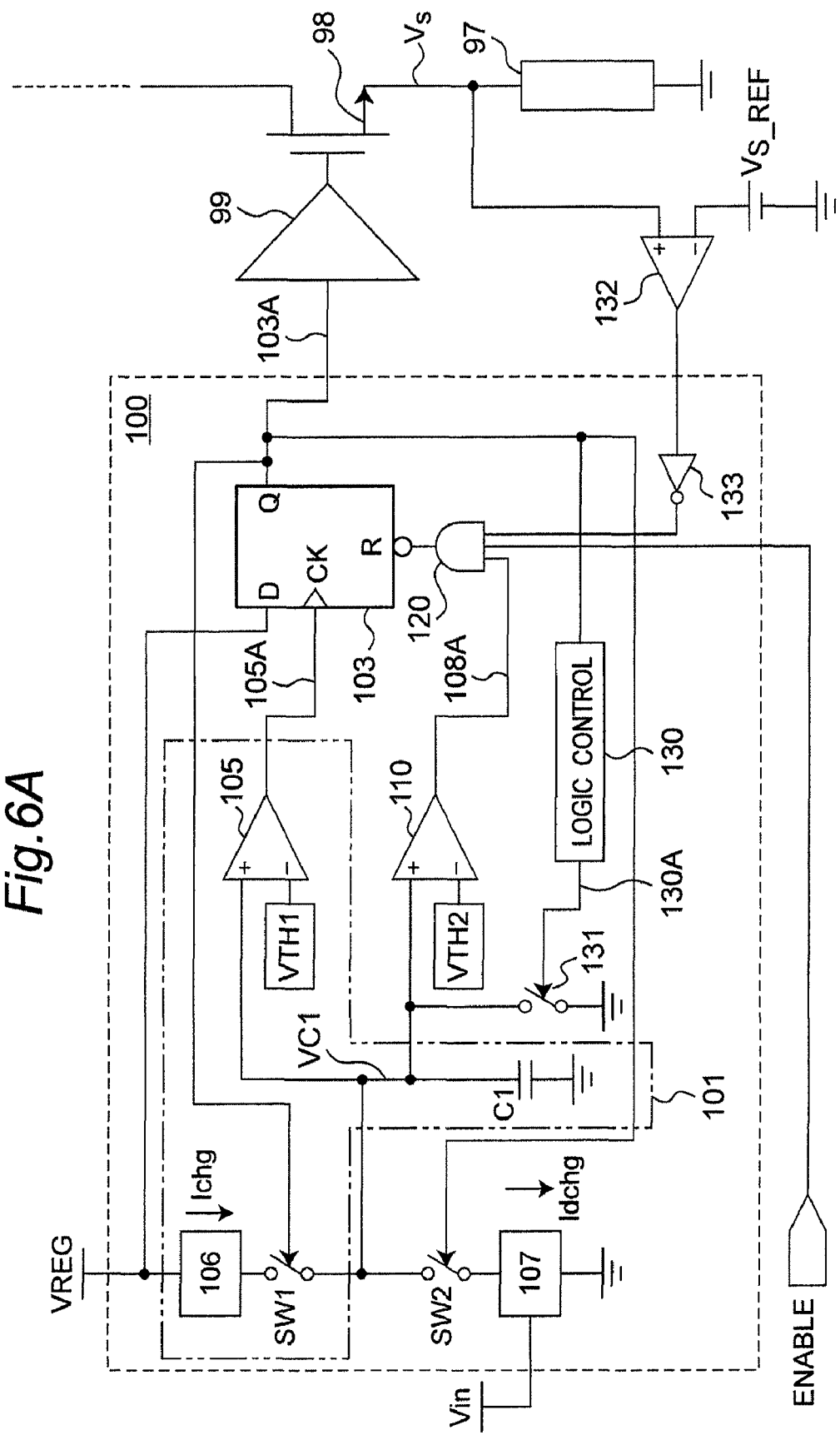
FIG. 6A is a circuit diagram showing an exemplary implementation of the third embodiment of the present invention, with the off-timer highlighted.
Figure 6B:
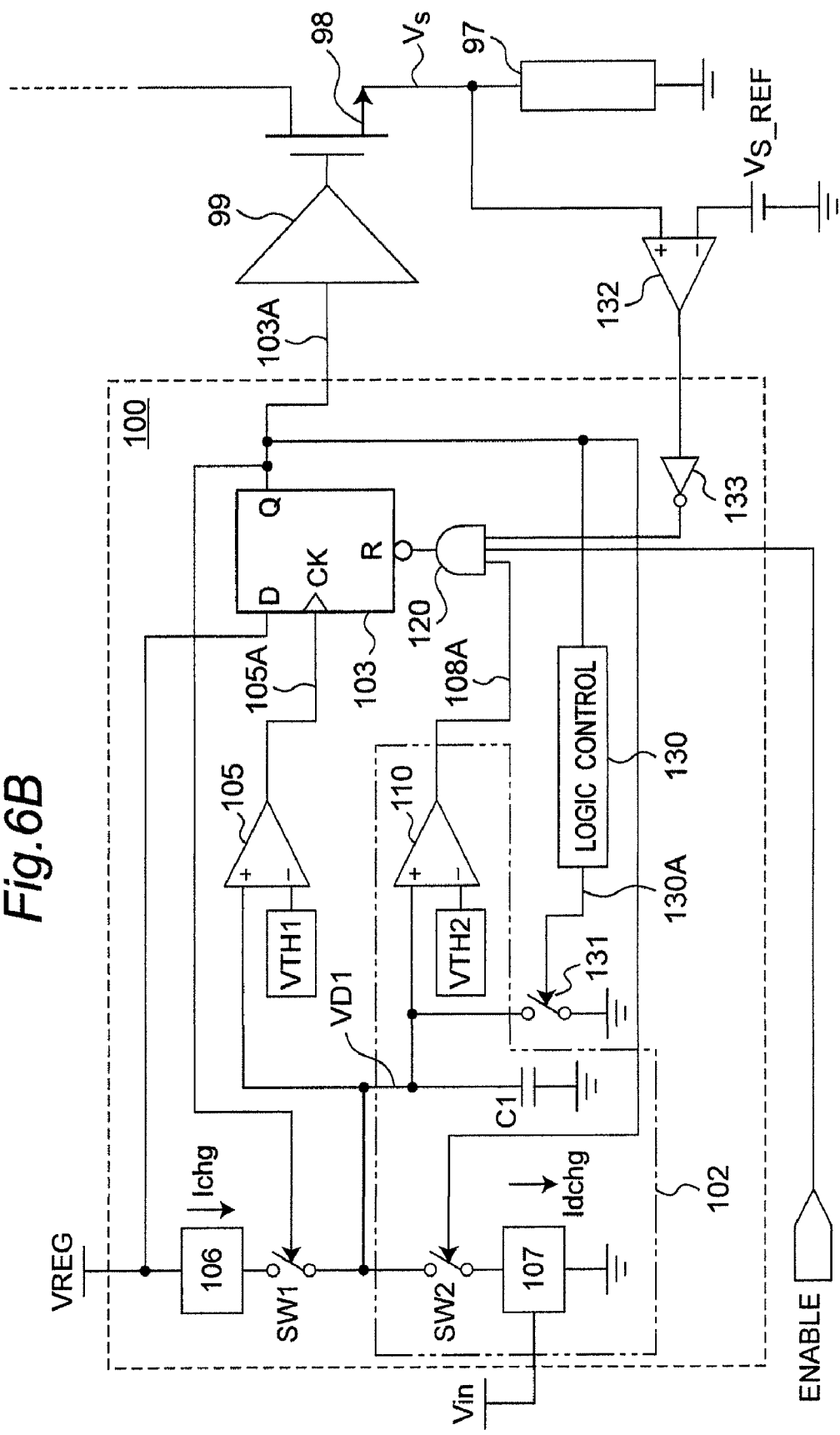
FIG. 6B is a circuit diagram showing an exemplary implementation of the third embodiment of the present invention, with the on-timer highlighted.

Referring to FIG. 6A and FIG. 6B, a third embodiment of an On-Off-Timer 101 according to the present invention is shown. The Off-timer and On-timer for the third embodiment are as highlighted in FIG. 6A and FIG. 6B respectively.

In the present embodiment, additional circuit elements have been added. These additional elements are: Logic Control 130, switch 131, comparator 132, and NOT gate 133. Switch 131 may be in the form of any known solid-state switches. For the purpose of explanation, an exemplary NMOS switch is used as switch 131, as shown in FIG. 3D.

Comparator 132 may be external or internal within the circuit. For the purpose of explanation, an exemplary implementation of comparator 132 external to the On-Off Timer 100 is used.

The purpose of the comparator 132 is to detect when the voltage $V_S$ is equal to a reference DC voltage $V_{S\_REF}$, where this would imply that the output current has reached the maximum threshold output current allowable (represented by reference voltage $V_{S\_REF}$), beyond which would cause damage to the NMOS output power transistor 98. Voltage $V_s$, which is the voltage across the sense resistor 97, essentially monitors the current through the NMOS output power transistor 98.

When such a situation happens, comparator 132 would emit a logic level so as to cause the timing duration of the On-Timer 102 to end. For an exemplary implementation of this step, comparator 132 outputs a logic HIGH signal to the inverter gate 133 before inputting as a third input for AND gate 120, which would then cause the D flip-flop 103 to be reset. This results in output Q of the D flip-flop 103 to go to logic LOW—signaling the start of the timing duration of the Off-Timer 101. NMOS output power transistor 98 would also turn off as a result.

However, when this sudden reset occurs, the capacitor C1 may not have been fully discharged yet. To start the timing duration of the Off-Timer 101 with a partially charged capacitor C1 would mean that the timing duration of the Off-Timer 101 would be inaccurate, as the instantaneous voltage across capacitor C1, VC1, will not always start at the same potential.

To overcome this problem, Logic Control 130 will close switch 131, so as to discharge capacitor C1 fully when such a situation occurs. By doing this, the instantaneous voltage across capacitor C1, VC1, will always start at 0V. The duration for which switch 131 will be closed is just sufficient for the capacitor to be fully discharged.

The corresponding waveforms of the voltage at output Q (node 103A) of D flip-flop 103, output 105A of comparator 105, node VC1 (instantaneous voltage across capacitor C1), Voltage $V_s$ (the voltage across the sense resistor 97) and node 130A (output terminal of Logic Control 130) illustrating the operation of the third embodiment is as shown in FIG. 7.

An exemplary implementation of Logic Control 130 is as shown in FIG. 8. Logic Control 130 comprises inverters 134 and 135, delay block 136, an AND gate 137 and an OR gate 138. The operation of the Logic Control 130 is as follows:

Initially, the output Q of D flip-flop 103 is at logic HIGH. Hence, node 103A is at logic HIGH. This thus follows that the output 134A of inverter 134 is at a logic LOW. Inverter 135 will output a logic HIGH signal at node 135A. After a predetermined time delay due to Delay block 136, the logic HIGH signal at mode 135A will be transmitted to node 136A. Based on the inputs at nodes 134A and 136A, AND gate 137 then outputs a logic LOW signal at node 137A. This is followed by an OR gate outputting a logic LOW signal at node 130A.

At the instance when the output Q of D flip-flop drops to logic LOW at instance of node (1) in FIG. 7, consequently node 134A goes to logic HIGH, and node 135A goes to logic LOW. However, AND gate 137 sees a logic HIGH signal at node 136A, due to the initial condition and also because the Delay block 136 causes a delay in transmission from node 135A to node 136A. As a result, AND gate 137 outputs a logic HIGH signal at node 137A. This further result in the OR gate 138 outputting a logic HIGH signal to node 130A. This thus results in the closing of switch 131, thus discharging any remaining charges still stored in capacitor C1. This will result in the drop of the voltage VC1 across capacitor C1 to node (2) of FIG. 7.

After completion of the delay caused by Delay block 136, the logic LOW signal at node 135A will be transmitted to node 136A. AND gate 137 will thus output a logic LOW signal at node 137A, followed by the OR gate 138 outputting a logic LOW signal at node 130A. This will then result in the opening of switch 131, marking the end of the discharge of capacitor C1. The predetermined delay time set for Delay block 136 is set to a time sufficient to discharge the said charges.

Having described the above embodiment of the invention, various alternations, modifications or improvement could be made by those skilled in the art. Such alternations, modifications or improvement are intended to be within the spirit and scope of this invention. The above description is by ways of example only, and is not intended as limiting. The invention is only limited as defined in the following claims.

What is claimed is:

1. An ON-OFF timer circuit for use in a DC-DC converter comprising:
    an Off-Timer to keep an Off duration constant;
    an On-Timer to limit an On duration so as not to exceed a pre-determined time limit; and
    a flip-flop operable to generate a first level signal and a second level signal from an output of the flip-flop for controlling said Off duration and On duration.

2. The ON-OFF timer circuit according to claim 1, wherein said Off-Timer comprises:
    a first current source;
    a first switch operable to receive said first and second level signals from said flip-flop;
    a first charging capacitor connected to said first current source through said first switch, said first charging capacitor operable to charge current according to said first current source during a time that said flip-flop generates said first level signal so as to produce an ascending DC voltage across said first charging capacitor; and
    a first comparator operable to compare said ascending DC voltage with a predetermined first threshold level, and operable to generate a latch signal when said ascending DC voltage reaches said first threshold level, said latch signal applied to said flip-flop to generate said second level signal.

3. The ON-OFF timer circuit according to claim 2, wherein said On-Timer comprises:
    a second current source;
    a second switch operable to receive said first and second level signals from said flip-flop;
    a second charging capacitor connected to said second current source through said second switch, said second charging capacitor operable to discharge current according to said second current source during a time that said flip-flop generates said second level signal so as to produce a descending DC voltage across said second charging capacitor; and
    a second comparator operable to compare said descending DC voltage with a predetermined second threshold level, and operable to generate a reset signal when said descending DC voltage drops to said second threshold level, said reset signal applied to said flip-flop to generate said first level signal.

4. The ON-OFF timer circuit according to claim 3, wherein said first charging capacitor and said second charging capacitor comprise a common charging capacitor.

5. The ON-OFF timer circuit according to claim 2, wherein said first switch is a solid-state type transistor.

6. The ON-OFF timer circuit according to claim 5, wherein said first switch is a PMOS-type switch.

7. The ON-OFF timer circuit according to claim 3, wherein said second switch is a solid-state type transistor.

8. The ON-OFF timer circuit according to claim 7, wherein said first switch is an NMOS-type switch.

9. The ON-OFF timer circuit according to claim 3, wherein said second current source comprises:
    a resistor;
    a first NPN transistor, having its an emitter terminal connected to ground, a base terminal connected to a base terminal of a second NPN transistor and a collector terminal connected to said second switch to discharge the charges from said second charging capacitor; and
    said second NPN transistor, having an emitter terminal connected to ground, a base terminal connected to its a collector terminal of the second NPN transistor and said collector terminal of the second NPN transistor connected to said resistor which is in turn configured to receive an input voltage.

10. The ON-OFF timer circuit according to claim 4, wherein said flip-flop is a D Flip-flop.

11. The ON-OFF timer circuit according to claim 10, further comprising:
    an AND gate, having an output terminal connected to a reset pin of said D flip-flop, a first input terminal connected to an output of said second comparator and a second input terminal configured to receive an external ENABLE signal.

12. The ON-OFF timer circuit according to claim 10, further comprising:
    a driver operable to receive said first and second level signals from said flip-flop;
    a power transistor operable to be turned ON and OFF by an output of said driver;
    a sense resistor provided between said power transistor and ground;
    an AND gate, having an output terminal connected to the reset pin of said D flip-flop, a first input terminal connected to the output of the said second comparator, a second input terminal configured to receive an external ENABLE signal and a third terminal connected to an output of a first inverter;
    a third switch connected between ground and said first charging capacitor;
    a logic controller operable to control said third switch;
    said first inverter, having an input terminal connected to an output of a third comparator; and
    said third comparator operable to compare a voltage across said sense resistor with a predetermined third threshold level, and operable to produce a stop signal when the voltage across said sense resistor reaches the third threshold level, said stop signal applied to said AND gate through said first inverter.

13. The ON-OFF timer circuit according to claim 12, wherein said logic controller comprises:

a second inverter, having an input connected to said output of said flip-flop;

a third inverter, having an input connected to said second inverter;

a delay having an input connected to said third inverter;

a second AND gate having a first input connected to said second inverter and a second input connected to said delay; and an OR gate having two inputs shorted and connected to said second AND gate, and an output connected to the output of said flip-flop.

* * * * *